United States Patent [19]

Flint

[11] 4,309,099
[45] Jan. 5, 1982

[54] ADJUSTABLE APEX CAMERA SYSTEM

[75] Inventor: Gene A. Flint, Waterloo, Iowa

[73] Assignee: Fred G. Clark, Jr., Waterloo, Iowa; a part interest

[21] Appl. No.: 195,676

[22] Filed: Oct. 9, 1980

[51] Int. Cl.³ ................... F16M 11/08; G03B 17/56
[52] U.S. Cl. .................................. 354/293; 248/186
[58] Field of Search ................... 354/81, 82, 293; 248/163, 186

[56] References Cited

U.S. PATENT DOCUMENTS

| | | | |
|---|---|---|---|
| 2,112,449 | 3/1938 | Proudfit | 354/293 X |
| 2,555,222 | 5/1951 | Coleman et al. | 248/163 R X |
| 2,945,428 | 7/1960 | Dearborn | 352/243 |
| 3,146,984 | 9/1964 | Matthews | 354/293 X |
| 3,371,589 | 3/1968 | Whittlesey | 354/81 |
| 3,445,082 | 5/1969 | Proctor et al. | 248/186 |
| 3,833,196 | 9/1974 | Protzman | 354/293 X |

Primary Examiner—Donald A. Griffin
Attorney, Agent, or Firm—Haven E. Simmons; James C. Nemmers

[57] ABSTRACT

A camera support system, particularly for close-up and copy photography, features a light-weight larger bipod consisting essentially of a pair of foldable legs, a transverse lower end member on one leg and the lower end of the other leg providing supporting feet for the system. The legs carry various adjustable mounts for one or more cameras, or accessories, one of the mounts being essentially a smaller bipod which can be similarly employed when detached from the larger. Both the larger and smaller bipods can be used in either upright or reclining positions and are readily foldable into compact form for carriage and storage.

15 Claims, 5 Drawing Figures

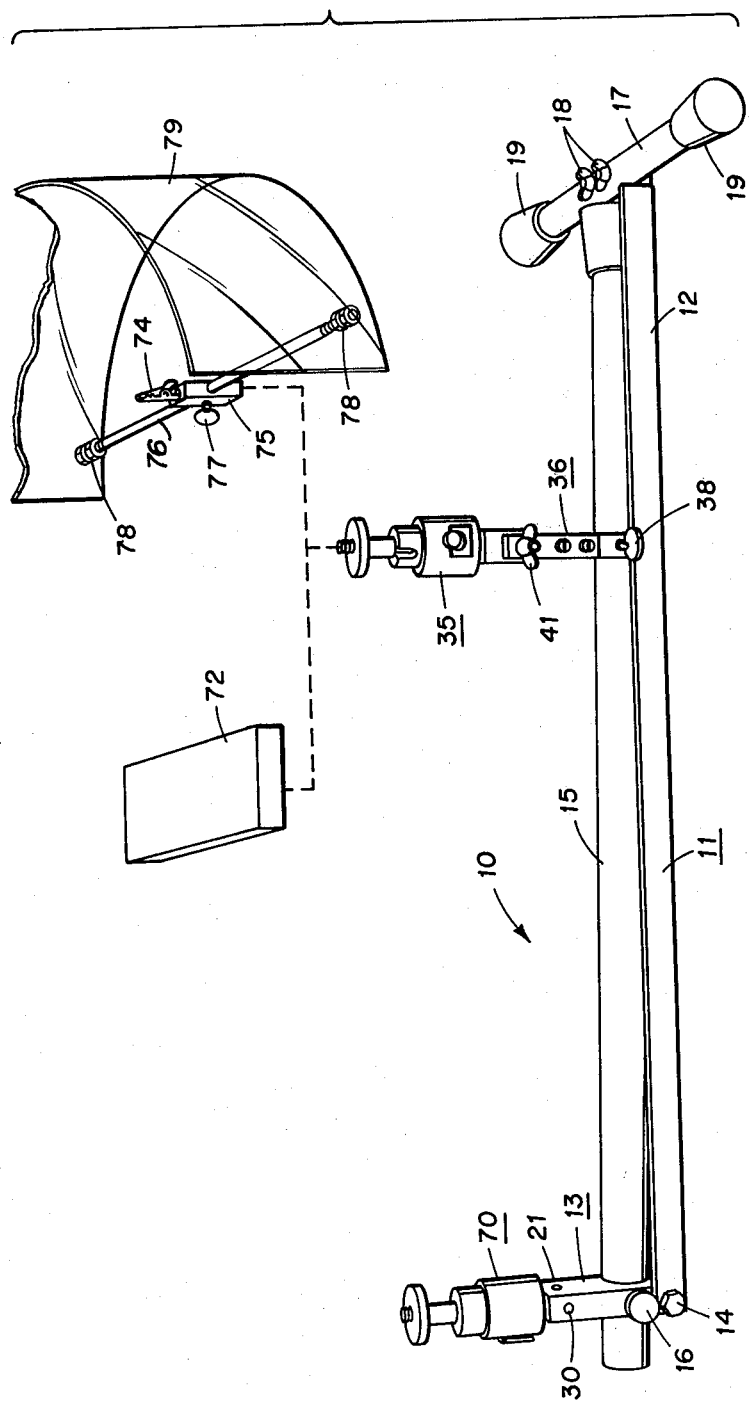
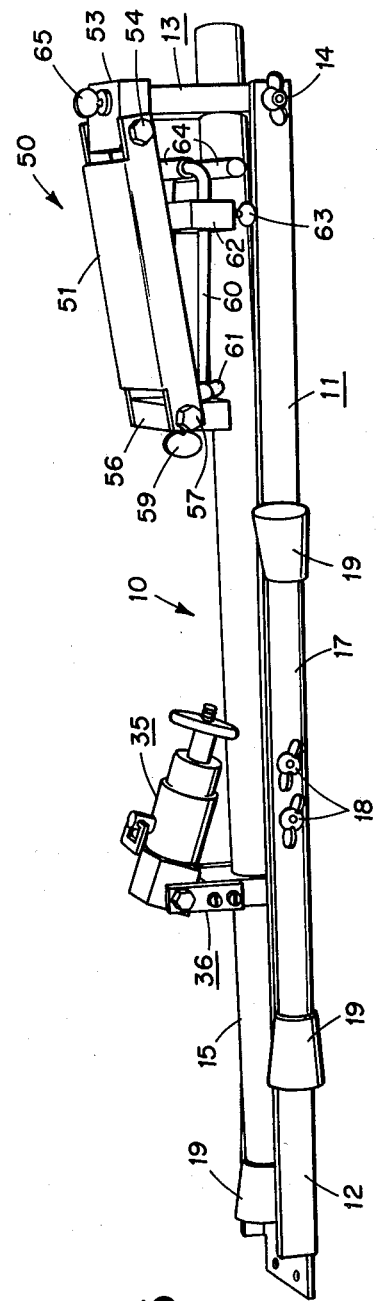

ADJUSTABLE APEX CAMERA SYSTEM

BACKGROUND OF THE INVENTION

A good sturdy camera tripod, however excellent it may be for much indoor and some outdoor photography, is often seriously at a loss out-of-doors in rough terrain or when performing close-up or copy work indoors or out. When close-up nature photography especially is undertaken in wooded or overgrown country, it is difficult or impossible to maneuver the typical tripod so that it is both stabile and convenient to hand as well as sufficiently close to what is to be pictured. Even indoors, where there are no terrain problems, the usual tripod is too large and inflexible for close-up copy work of various kinds without special attachments for those purposes. One I know of amounts to little more than an addition to the tripod for lowering the camera. Another is a low, "spider-like" stand with three or four legs. But more to the point is the one shown in U.S. Pat. No. 3,586,278. This, however, consists of a rather elaborate and cumbersome array of legs and interconnected rods, all not readily assembled or disassembled for transport or storage besides being not really suitable for much inside or outside work. For some nature photography especially it would doubtless take too long to set up before the "subject" would have vanished. Probably it would be too noisy as well, for silence is one of the requisites of nature photography in those cases. At any rate, until my present invention, I am aware of no camera support system specifically addressed to the problems concerned, one which is particularly adapted to indoor and outdoor close-up and copy photography, which is also useful for general photography, and which at the same time is light in weight, silent, flexible and compact.

SUMMARY OF THE INVENTION

The camera support system of my invention, which I deem best described as an "adjustable apex camera system", incorporates a pair of supports, each of which is essentially a bipod. One of the bipods is larger than the other and consists of a pair of legs adjustably pivoted to a fixture at their upper ends, one of the legs being of channel shape and the other cylindrical, the lower end of the former having a transverse base whose outer ends and the lower end of the cylindrical leg provide supporting feet. The pivot fixture between the legs, constituting the apex of the larger bipod, carries the smaller of the two bipods which is basically a duplicate of the larger and can be employed apart from the latter in a similar manner for extreme close-up or copy work as well as for ordinary time and other exposures. Various camera mounts are adjustably attached to the apices of either or both bipods and/or to a leg of the larger. The legs themselves of the two bipods can be folded upon each other and the transverse base detached and secured along one leg so that the entire system is in a compact and handy form for transport and storage. When folded the larger of the bipods can also be used in a horizontal position in the manner of an "optical bench" with the camera supported on the one mount and the object to be photographed supported on a small table or in a small vise carried on another of the mounts.

Other and further features and advantages of the invention will become apparent from the drawings and the more detailed description which follows.

BRIEF DESCRIPTION OF THE DRAWINGS

FIG. 4 is likewise a perspective view showing my system horizontally disposed for use as an "optical".

FIG. 5 is a further perspective view showing my system folded for transport and storage.

DETAILED DESCRIPTION OF THE PREFERRED EMBODIMENT

Figure 1:
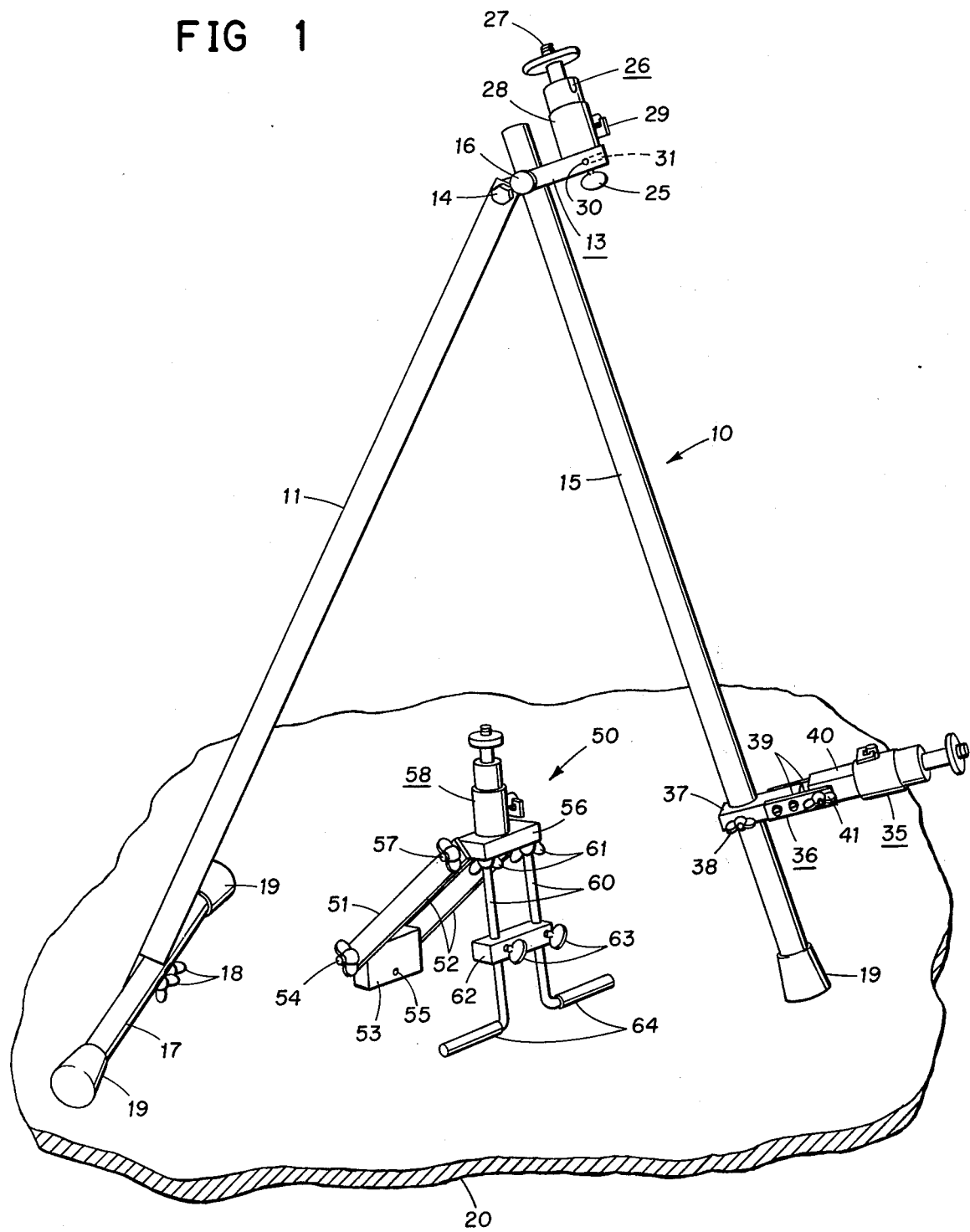
FIG. 1 is an upright perspective view of the two bipods which comprise my apex camera support system, the smaller being shown dismounted from the larger for separate use.
Figure 2:
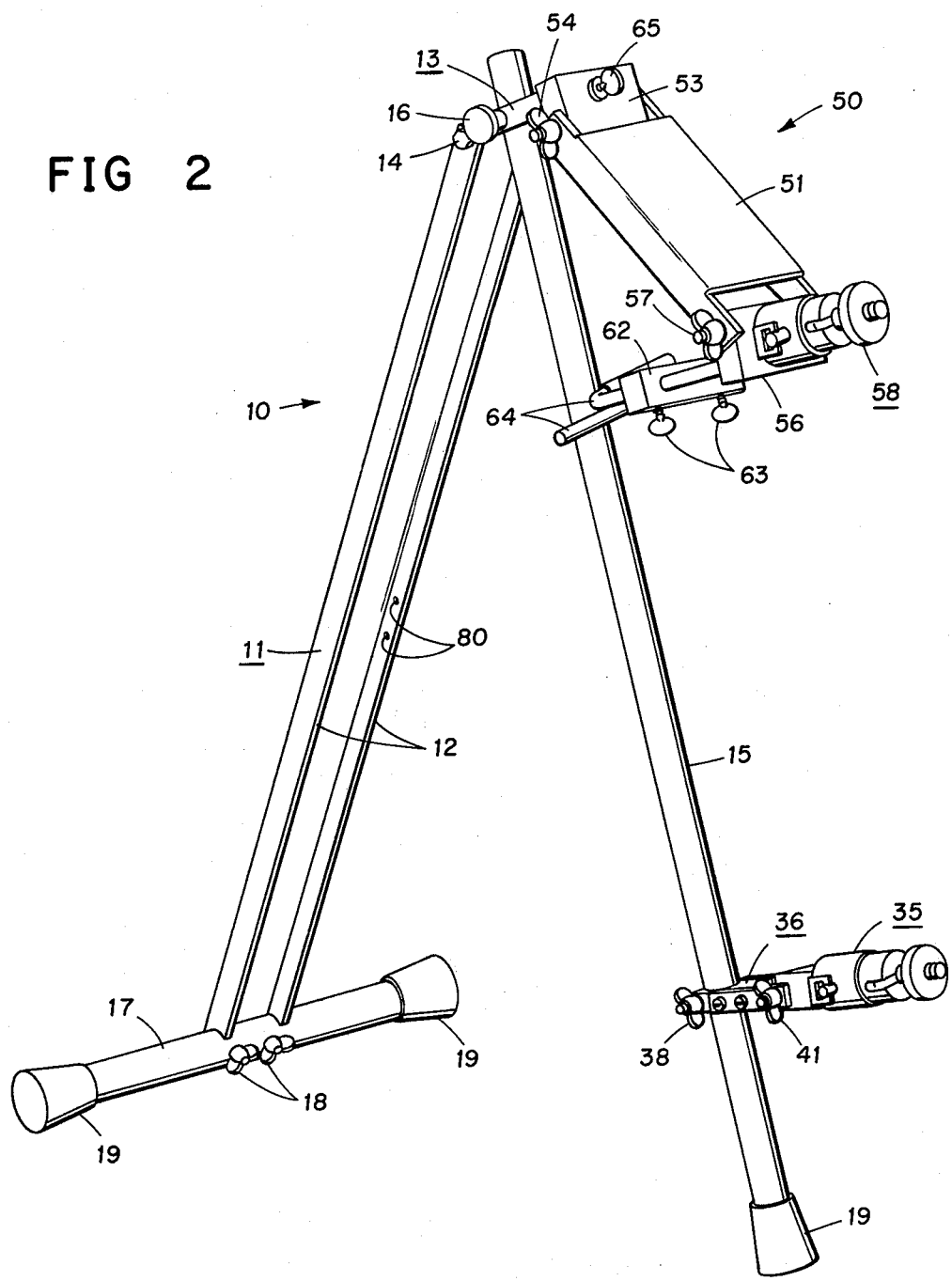
FIG. 2 is also an upright perspective view of my system with the smaller bipod shown in one position on the larger.
Figure 3:
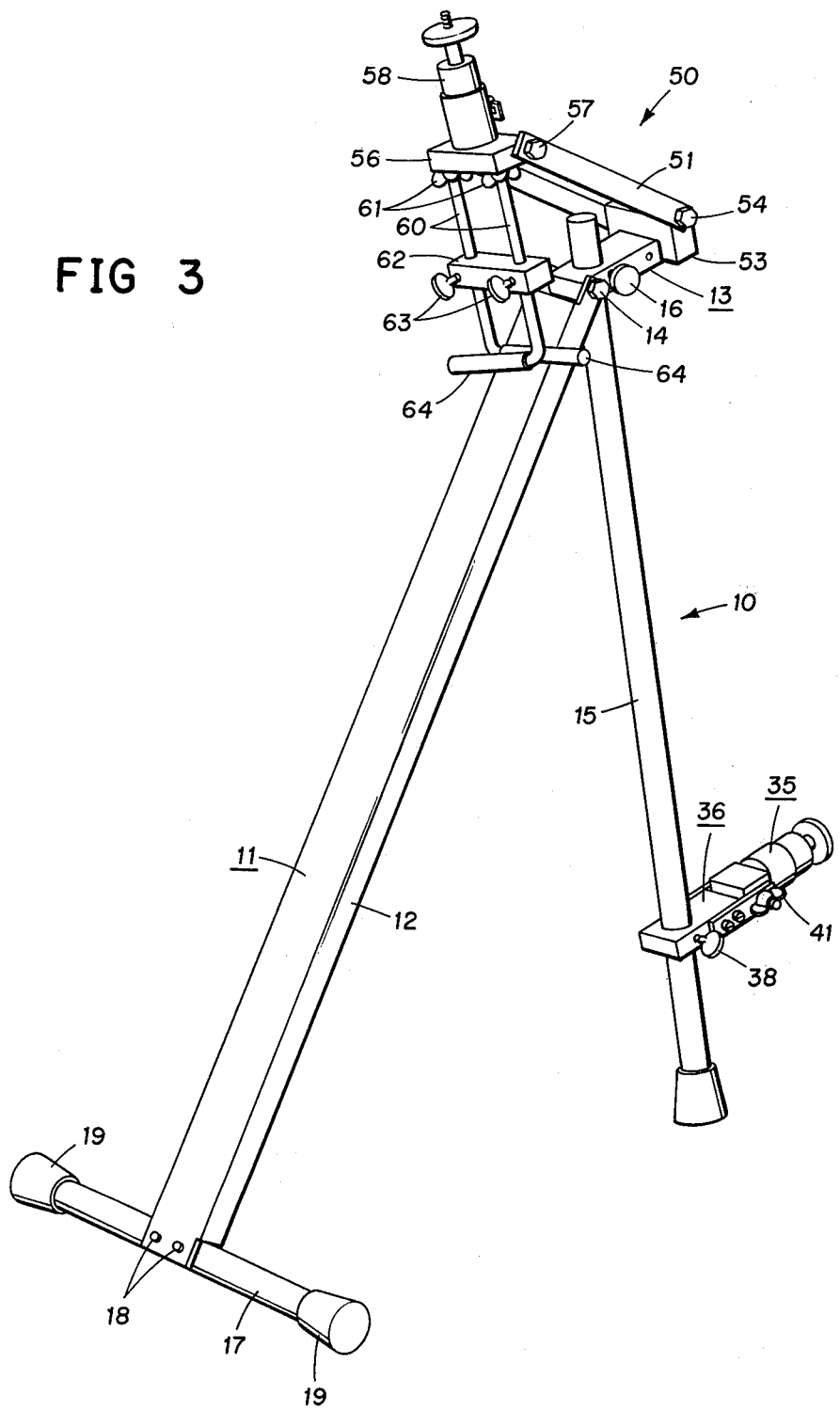
FIG. 3 is similar to FIG. 2 except that the smaller bipod is shown in another position on the larger.

In FIGS. 1 through 3 the larger of the two bipods of my system, generally indicated at 10, is illustrated in the form of a channel shaped leg 11 having side walls 12 between the upper ends of which is secured a first fixture 13 in the form of a mounting block pivoted at one end about an axis defined by a transverse clamp bolt 14. The fixture 13 is bored to slidably receive the upper end of a cylindrical leg 15 which is adjusted lengthwise relative to the fixture 13 by a clamp screw 16. A transverse cylindrical base member 17, parallel to the axis of the clamp bolt 14 and normal to the channeled leg 11, is removably secured as shown at 18 to a tongue formed on the lower end of the leg 11. The lower end of the leg 15 and the outer ends of the base member 17 are preferably fitted with rubber-like tips 19. The latter function as feet for the bipod 10 and support it upright as shown on whatever underlying terrain or surface 20 is involved, whence the fixture 13 forms the apex of the bipod 10. By releasing the clamp bolt 14 and spreading the legs 11 and 15 and/or releasing the clamp screw 16 and sliding the leg 15 through the fixture 13, the overall height of the apex of the bipod 10 can be adjusted relative to the surface 20. These two manners in which the height of the bipod 10 can be adjusted is especially helpful in out-of-doors nature photography where space or obstacles may limit the spread of the legs 11 and 15. Indeed, the leg 15 can be swung sufficiently far about the clamp bolt 14 so that the device in effect doubles its ordinary height and becomes a monopod.

The other end of the fixture 13 is provided with a transverse bore 21 (see FIG. 4) through its upper and lower faces which receives a clamp screw up therethrough to removably engage a typical camera panning head 26. The latter is a well-known proprietary item and features a fixing screw 27 which is adjustably swiveled relative to the body 28 of the head by a clamp screw 29. One side face and the outer end face of the fixture 13 are provided with respective threaded bores 30 and 31 intersecting the bore 21 so that other items, such as a camera flash, reflector, timing equipment, etc., can be mounted on the fixture 13 and so that the latter can be employed in the manner later described in connection with FIG. 4. A similar panning head 35 may be mounted on the leg 15 by means of a second fixture 36. The latter comprises a base block 37 slidably receiving the leg 15 and adjusted therealong by a clamp screw 38. Between a pair of plates 39 fixed as shown to and extending from the free end of the block 37 a second block 40 is adjustably pivoted relative thereto about a clamp bolt 41 and carries the head 35. The fixture 36 thus provides an alternate position for a camera whose height can be adjusted independently of the height of the bipod 10. This feature is especially useful in nature work as well as indoors when the bipod 10 is used in the manner later described in connection with FIG. 4.

The smaller of the two bipods of my system is also illustrated in FIGS. 1 through 3 and generally indicated at 50. It includes a channel shaped stub leg 51 having side walls 52 between the lower ends of which a mounting block 53 is pivoted about a clamp bolt 54 and provided with a bore 55 therethrough for mounting the bipod 50 upon the fixture 13, as later described. Between the upper ends of the channel side walls 52 is pivoted a base block 56 about a clamp bolt 57 parallel to the bolt 54. The block 56 which constitutes the apex of the bipod 50 may, as shown, support another panning head 58 secured by a suitable clamp screw 59 (shown in FIG. 5 in its storage position after removal of the head 58) up through the block 56. The other stub leg of the bipod 50 takes the form of a pair of parallel rods 60 threaded at their upper ends into the lower face of the base block 56 and fixed by wing nuts 61. Slidably disposed on both rods 60 is a tie block 62, whose position is adjusted by clamp screws 63, which helps stabilize the two rods 60. The lower ends of the rods 60 are cranked in opposite directions laterally of the channeled leg 51, the cranked ends being fitted with elastomeric sleeves 64. The latter and the mounting block 53 thus function as feet and support the bipod 50 upright as shown in FIG. 1. The overall height of the apex of the bipod 50 can be adjusted by the spread of the stub legs 51 and 60 and secured by the clamp bolt 57.

The bipod 50 may be used in the manner shown in FIG. 1, wholly apart from the bipod 10, for extreme close-up or copy work in the field or studio when the object to be photographed is not to be disturbed from its setting or need not be specially mounted for photographing. The bipod 50 is also useful by itself as a small, compact camera support when taking ordinary time exposures or when camera stability is needed in any situation, especially where the underlying area available is very limited, such as a rock, a tree stump, and so forth. It can even be used against one's chest to support a camera. The bipod 50 may also be combined with the bipod 10 and employed in the manners shown in FIGS. 2 and 3, the bipod 50 in effect then becoming a third fixture on the bipod 10. For this purpose the mounting block 53 is adjustably attached to the outer end of the fixture 13 by means of a clamp screw 65 through the bore 55 and threaded into the end bore 31 of the fixture 13. In these positions the bipod 50 in effect provides a cantilevered extension of the bipod 10 in a multitude of directions for pictures that cannot be taken from the bipod 10 alone owing to intervening obstacles or in other situations which restrict the location or adjustment of the bipod 10.

The leg 15 of the bipod 10, after loosening the clamp bolt 14, can be folded scissors-like into the channel of the leg 11 and then the latter laid in a horizontal or reclining position as shown in FIG. 4, whereupon it is supported by the upper end of the leg 11 and the outer tipped ends 19 of the base member 17 and becomes a kind of "optical bench". In order to increase the rigidity of the bipod 10 in this position, the width of the base block 37 of the fixture 36 is made a close fit between the channel leg side walls 12. A panning head 70 may then be screwed into the bore 31 of the fixture 13 to support a camera and the panning head 35 adjusted to support either a small rectangular table 72 or vise clip 74 mounted on a block 75 screwed on to the head 35. The mounting block 75 may also include a transverse rod 76 therethrough, adjusted by a clamp screw 77, whose outer nutted ends 78 carry a semi-circular transparent wind screen or shield 79. The location of the table 72 or the vise clip 74 relative to the panning head 70 can be adjusted by loosening the clamp screw 38 and sliding the fixture 36 along the leg 15. Of course the positions of the camera and the table 72 or clip 74 on the heads 35 and 70 could be reversed. The table 72 or the clip 74 can also be mounted on the head in the case of the set-up shown in FIG. 2 and then adjusted to a level position. With a camera on the head 58, overhead shots of mounted subjects can thus be taken.

When the system is to be transported or stored, the bipod 10 is folded in the same manner as in FIG. 4 and the fasteners 18 are removed from the base member 17. The latter is then placed alongside the leg 11 and reattached with the fasteners 18 to one side wall 12 in holes 80 (see FIG. 2) provided for that purpose. The bipod 50 is next folded to the position shown in FIG. 5 by loosening the clamp bolts 54 and 57, and then the wing nuts 61 and the clamp screws 63 so that the rods 60 may be rotated to turn their cranked ends 64 inwardly. One or more of the panning heads 26, 35, 58 or 70 may be removed or simply stored in place, as shown in the case of the head 35, whereupon the system will assume more or less the configuration shown in FIG. 5. The bipod 50, if detached from the fixture 13, can be folded up for storage or transport in the same manner.

All the metal parts (except the various clamp screws and bolts) are readily fabricated from light-weight material such as aluminum, the leg 15 and the base member 17 being tubular. Insofar as suitable dimensions are concerned, the legs 11 and 15 of a working prototype of the bipod 10 are each about 24 inches in length and the base member 17 about 12 inches in length, while the stub legs 51 and 60 of the bipod 50 are each about 6 inches in length. If desired, in order to increase the adaptability of the bipod 10 to various terrain, the connection between the channel leg 11 and the base member 17 could be a pivotal one and an additional clamp bolt employed so that the angle between the two can be adjusted. My invention therefore provides an apex camera system which is light-weight and compact as well as readily adapted to various conditions indoors and out. While many of its features are designed for close-up and copy photographic work, it is also readily adapted to general photography indoors and out owing to its flexibility and convenience. Hence, though my invention has been described in terms of a particular embodiment, being the best mode known of carrying out my invention, it is not limited to that embodiment alone. Instead the following claims are to be read as encompassing all adaptations and modifications of my invention falling within its spirit and scope.

I claim:

1. A device of the class described comprising: first and second longitudinally extensive base legs having opposite ends and a pivotal interconnection located thereon for scissors-like movement of the base legs with respect to each other; a transverse base member affixed to one end of one of the base legs and extending laterally from opposite sides of said base leg, the outer ends of the base member and one end of the other base leg constituting feet effective to engage an underlying basis and render the device self-supporting in a generally upright position thereon, whereby the other ends of the base legs constitute their upper ends, said pivotal location being adjustable longitudinally of at least one of the base legs; and first mounting means carried by at least one of the base legs for removably mounting thereon a first support assembly.

2. The device of claim 1 in which said pivotal interconnection comprises a first fixture secured adjacent the upper end of the first base leg for pivoting movement relative thereto about an axis parallel to the base member, the first fixture also constituting the first mounting means, and in which said pivotal location adjustment comprises an engagement of the first fixture and the second base leg effective for longitudinal movement of the second base leg relative to the first fixture, and clamp means carried by the first fixture effective to secure the same to the second base leg at selected locations therealong.

3. The device of claim 2 in which the first leg comprises a channeled member, the base member being affixed thereto as aforesaid and the first fixture pivoted as aforesaid to the upper end of the channeled member between the side walls thereof, and in which the second base leg comprises a cylindrical member extending slidably through the first fixture, the cylindrical member being foldable about said pivotal interconnection into the channel of the channeled member.

4. The device of claim 3 including second mounting means for removably mounting a second support assembly thereon and comprising a second fixture carried by the cylindrical member, the second fixture including first and second members pivotally interconnected, the second member being adapted to carry said second support assembly, the cylindrical member extending through said first member for slidable movement of the second fixture longitudinally of the cylindrical member, and clamp means carried by said first member effective to secure the same to the cylindrical member at selected locations therealong.

5. The device of claim 4 in which the upper end of the channeled member and the outer ends of the base member also constitute feet effective to engage an underlying basis and support the device in a reclining position thereon when the cylindrical member is folded into the channeled member as aforesaid, the first and second mounting means being also effective to respectively support the first and second support assemblies so that both support assemblies are disposed in an upright position above the cylindrical member when the device is in said reclining position.

6. The device of claim 5 in which one of the first and second support assemblies is a camera support and the other an object support.

7. The device of claim 6 in which the base member is removable from the channeled member and attachable to the side exterior thereof so that the base member extends longitudinally of the channeled member.

8. The device of any one of claims, 1, 2, 3, 4, 5, 6 or 7 in which one of the mountng means also includes a third fixture having first and second stub legs shorter than the base legs, one end of the first stub leg being removably pivotally interconnected to said one mounting for pivotal movement relative thereto, the other end of the first stub leg and one end of the second stub leg being pivotally interconnected for pivotal movement relative to each other, said interconnection carrying third mounting means for mounting a third support assembly thereon, the third fixture being optionally removable from said one mounting means.

9. The device of claim 8 in which said pivotal interconnections of the third fixture provide movement about respectively first and second parallel axes.

10. The device of claim 9 in which the first stub leg comprises a channeled member, said parallel axes extending transversely of and between the side walls of the channeled stub member, the second stub leg being foldable about said second parallel axis between the side walls of the channeled stub member.

11. The device of claim 10 in which said one end of the first stub leg includes a transverse mounting member pivotally secured thereto between the side walls of the channeled stub member about said first parallel axis and removably secured to said one of the mounting means, the other end of the second stub leg extending laterally beyond each side wall of the channeled stub member and together with said transverse mounting member constituting feet effective, when the third fixture is removed from said one of the mounting means, to engage an underlying basis and render the third fixture self-supporting in a generally upright position thereon.

12. The device of claim 11 in which the one or more of the support assemblies comprise camera supporting assemblies.

13. A bipod camera support comprising a first mounting member and a pair of short legs having respective upper and lower ends, the first mounting member being adapted to carry an adjustable camera supporting assembly, the upper end of at least one of the legs being pivoted to the first mounting member about a first axis; clamp means for selectively adjusting the attitude of the first mounting member and said one leg relative to each other about said axis, the upper end of the other leg member being attached to the first mounting member for movement with the first mounting member relative to said one leg about said axis; a second mounting member pivoted to the lower end of said one leg for movement relative thereto about a second axis parallel to the first axis; clamp means for selectively adjusting the attitude of the second mounting member and said one leg relative to each other, the second mounting member and the lower end of said other leg also constituting feet effective to engage an underlying basis and render the camera mount self-supporting in a generally upright position thereon, the second mounting member also being adapted for attachment to a separate structure for supporting the camera mount in mid-air above an underlying basis.

14. The camera mount of claim 13 in which said one leg comprises a channeled member, the first and second mounting members being pivoted as aforesaid between the side walls of the channeled member, and in which the first mounting member and said other leg are foldable about said first axis between the side walls of the channeled member.

15. The camera mount of claim 14 in which said other leg comprises a pair of spaced parallel rods secured at their upper ends in the first mounting member, the lower ends of the rods being cranked laterally of the side walls of the channeled member effective to extend in opposite directions therebeyond, the cranked ends of the rods constituting the aforesaid feet provided by the lower end of said other leg, each rod being rotable about the axis of its upper end in the first mounting member so that the cranked lower ends of the rods may be swung toward each other and disposed in overlapping relation.

* * * * *